United States Patent [19]
Bell

[11] 3,893,771
[45] July 8, 1975

[54] LASER ABSORPTION SPECTROSCOPY
[75] Inventor: William E. Bell, Mountain View, Calif.
[73] Assignee: Diax Corporation, Sunnyvale, Calif.
[22] Filed: Aug. 22, 1974
[21] Appl. No.: 499,442

[52] U.S. Cl. ............. 356/97; 250/345; 331/DIG. 1; 356/51; 356/204
[51] Int. Cl.² ..................... G01J 3/42; G01N 21/24
[58] Field of Search ......... 356/51, 74, 204, 75, 201, 356/96, 97; 331/DIG. 1, 94.5 C; 250/343, 345

[56]  References Cited
UNITED STATES PATENTS

| | | | |
|---|---|---|---|
| 3,322,026 | 5/1967 | Rigrod | 331/DIG. 1 X |
| 3,405,370 | 10/1968 | Kaminow | 331/94.5 C |
| 3,659,452 | 5/1972 | Atwood et al. | 73/23 |
| 3,732,017 | 5/1973 | Wolber | 356/201 |
| 3,793,579 | 2/1974 | Cason et al. | 356/98 X |
| 3,820,901 | 6/1974 | Kreuzer | 356/97 |

OTHER PUBLICATIONS

Kreuzer et al., Science, Vol. 177, July 28, 1972, pages 347–349.
Leite et al., Journal of the Optical Society of America, Vol. 54, No. 8, August 1964, pages 981–983.
Weber et al., Journal of the Optical Society of America, Vol. 57, No. 1, January 1967, pages 19–28.
Smith, I.B.M. Technical Disclosure Bulletin, Vol. 16, No. 6, November 1973, pages 1804 and 1805.
Kreuzer, Analytical Chemistry, Vol. 46, No. 2, February 1974, pages 239A–244A.

*Primary Examiner*—Ronald J. Wibert
*Assistant Examiner*—F. L. Evans
*Attorney, Agent, or Firm*—Lowhurst, Aine & Nolan

[57] ABSTRACT

In laser absorption spectroscopy, an absorption sample cell containing the sample under analysis, is interposed within the optical cavity of a laser. In this manner, the laser beam power available for application to the sample is increased by a substantial factor, for example by 10 or 100 for a given input power to the laser. In addition, the number of usable laser lines of a tunable laser source is substantially increased, for example by 10 or 100 as contrasted with a laser absorption spectrometer wherein the sample is located outside of the laser cavity.

18 Claims, 3 Drawing Figures

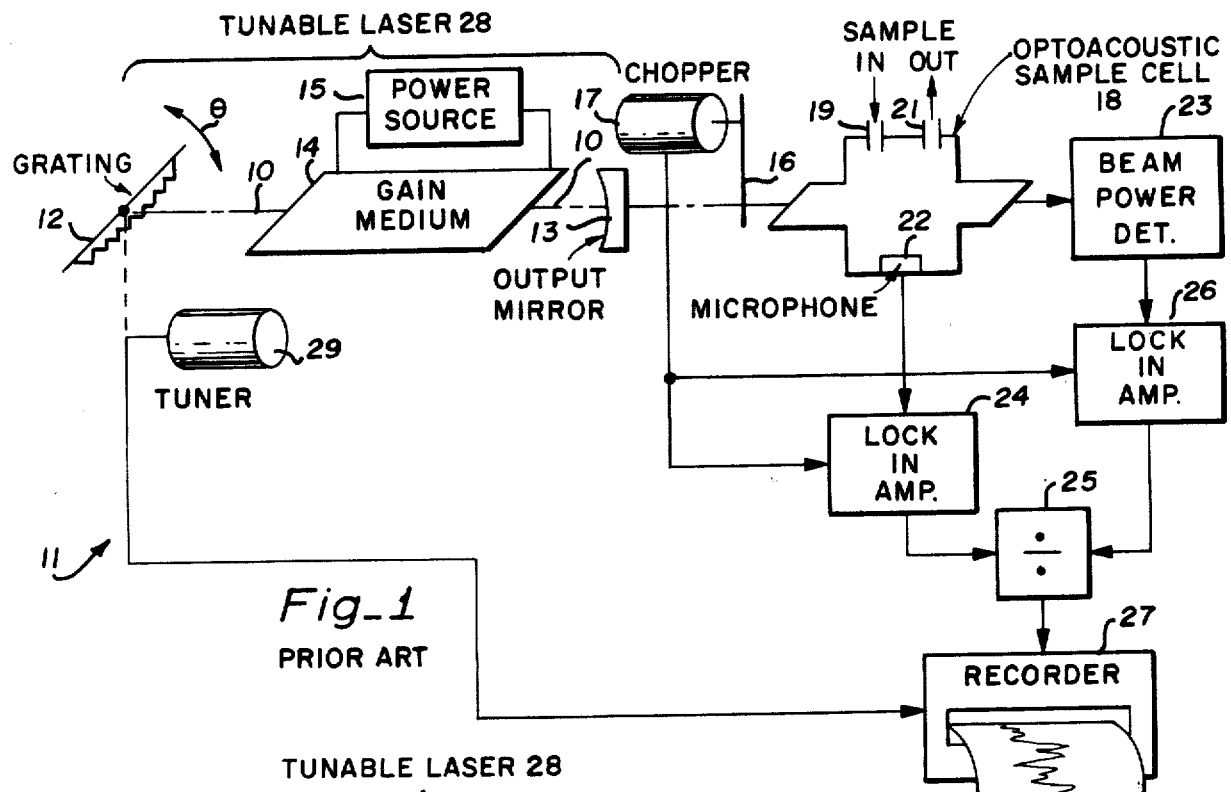
*Fig_1*
PRIOR ART
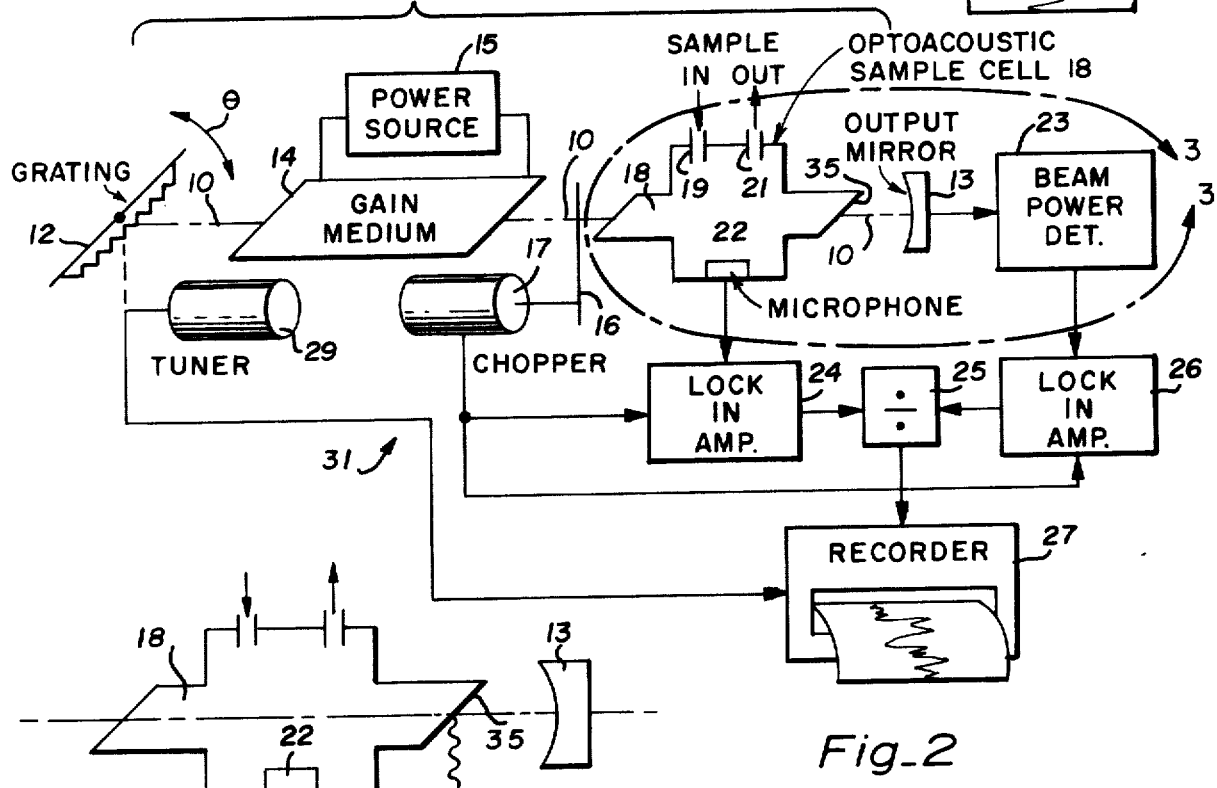
*Fig_2*
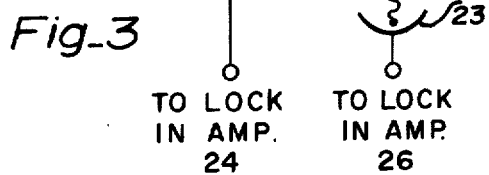
*Fig_3*

LASER ABSORPTION SPECTROSCOPY

BACKGROUND OF THE INVENTION

The present invention relates in general to laser absorption spectroscopy and, more particularly, to such spectroscopy wherein absorption of infrared energy from a laser beam by a sample under analysis is monitored by a detector coupled in energy exchanging relation with the sample for detecting energy absorption as a function of the wavelength of the laser beam power applied to the sample.

DESCRIPTION OF THE PRIOR ART

Heretofore, infrared laser absorption spectroscopy has employed an optoacoustic sample detection cell for analyzing gaseous samples and, in particular, for detecting certain pollutants in the air to concentration levels as low as parts per billion. Such a laser spectrometer is disclosed in: U.S. Pat. No. 3,820,901 issued June 28, 1974; in an article titled "Laser Optoacoustic Spectroscopy: A New Technique of Gas Analysis" appearing in *Analytical Chemistry*, Vol. 46, No. 2 of February 1974, pages 239-244; in *Science*, Vol. 177, pages 347-349 of 28 July 1972 in an article titled "Air Pollution: Sensitive Detection of Ten Pollutant Gases by Carbon Monoxide and Carbon Dioxide Lasers"; and in U.S. Pat. No. 3,659,452, issued May 2, 1972.

In these prior art laser absorption spectrometers, the laser, which is preferably a relatively high power output carbon dioxide or carbon monoxide laser, produces an output laser beam which is tunable to selected wavelengths within a band of infrared wavelengths of interest, i.e., the band of wavelengths over which certain gaseous sample constituents are known to have infrared absorption spectra. The laser output beam is directed through an optoacoustic cell containing the gaseous material to be analyzed. A sensitive microphone is coupled to the gaseous sample inside the sample cell. The laser beam is chopped at a certain chopping frequency, as of 25 Hertz, to produce a corresponding modulation of the absorption, if any, of the laser beam energy by the sample gas under analysis. Absorption of energy from the laser beam by the gas produces heating thereof which results in generating an acoustic wave which is detected by the microphone. The detected signal is processed to produce an output signal as a function of the wavelength of the infrared energy of the tunable laser beam to derive an absorption spectrum of or absorption spectral data concerning the sample under analysis.

The detected microphone signal is proportional to the incident infrared laser beam power and to the concentration of the absorbing gaseous constituent under analysis. When detecting low sample concentrations, such as parts per billion, the power absorbed by the gaseous constituents in the sample cell will be relatively low. Therefore, it is desired that the output laser beam power be as high as possible per line wavelength and typically this output has been in the range of about 0.1 to 1 watt.

Another difficulty that is encountered in the prior laser optoacoustic spectrometers is that the different laser lines, produced by a given laser, have widely differing power levels. It is extremely difficult to achieve the necessary high output power over a relatively large number of the available laser lines.

Therefore, it is desired to provide a laser spectrometer wherein the power of the individual laser lines can be substantially increased as this will increase the sensitivity of the spectrometer. In addition, it is desired to provide a greater number of laser lines over which a more nearly equal and necessary relatively high power can be obtained.

It is known from the prior art of Raman spectroscopy to place a Raman sample cell inside or outside of the laser cavity. In such a Raman spectrometer, laser light is scattered by the liquid or gaseous molecules of the sample into sidebands of the illumination laser line. A monochromator is used to look at and to detect the scattered Raman sideband spectrum to yield information about the sample under analysis. Raman laser spectrometers are distinguished from those of the present invention by operating on a light scattering mode of operation as opposed to infrared absorption and are described in the following articles: "Continuous Photoelectric Recording of the Raman Efect in Liquids Excited by the He-Ne Red Laser", *Journal of the Optical Society of America*, Vol. 54, No. 8 of August 1964, pages 981-983; and "High-Resolution Raman Spectroscopy of Gases with CW-Laser Excitation", *Journal of the Optical Society of America*, Vol. 57, No. 1, January 1967, pages 19-28. It is also known from the prior art of laser spectroscopy to place a reference cell of gas having a certain absorption spectrum in the optical laser cavity and to tune the laser across the absorption spectrum of the reference cell so that the laser will only lase on certain lines as determined by the reference gas to obtain a certain spectrum of laser irradiation for irradiation of a sample cell outside of the laser cavity. Such a spectrometer is disclosed in U.S. Pat. No. 3,732,017 issued May 8, 1973.

SUMMARY OF THE PRESENT INVENTION

The principal object of the present invention is the provision of an improved laser spectrometer of the type wherein a detector is coupled in energy exchanging relation with the sample medium for detecting absorption of laser beam energy by the sample under analysis.

In one feature of the present invention, the sample which is to be analyzed by the laser beam is interposed inside the optical laser cavity, whereby the infrared power per line is substantially increased and whereby a larger number of usable laser lines are provided, such lines also having more nearly equal power.

In another feature of the present invention, a portion of the laser beam inside the laser cavity is diverted to a beam power monitor for decreasing the overall length of the laser spectrometer.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, partly in block diagram form of a prior art laser spectrometer, FIG. 2 is a schematic line diagram, partly in block diagram form, of a laser spectrometer incorporating features of the present invention, and FIG. 3 is a diagram of a portion of the apparatus of FIG. 2 delineated by line 3—3 and depicting an alternative embodiment of the present invention.

DESCRIPTION OF THE PREFERRED EMBODIMENTS

Referring now to FIG. 1, there is shown the prior art laser spectrometer 11. Briefly, the spectrometer 11 includes an optical cavity resonator defined by the optical path between a diffraction grating 12 (wavelength selector) and a partially transmissive output mirror 13. An envelope 14, having Brewster windows at opposite ends and containing a conventional gaseous gain medium, such as carbon monoxide, carbon dioxide, or a helium-neon mixture, is interposed along the optical resonator path 10 between the grating 12 and the output mirror 13. The gain medium is excited by a suitable electrical discharge to provide coherent stimulated emission of radiation at a resonant optical wavelength of the optical resonator. Power is supplied from a power source 15 to the gain medium to sustain the electrical discharge and laser action.

The output mirror 13 is an output coupler for the laser beam and its reflectivity is preferably matched to the gain of each laser line to obtain maximum output power for each laser line (wavelength). The output laser beam is modulated by means of a rotatable perforated chopper disc 16 driven by a motor 17. An optoacoustic sample cell 18 is disposed in the modulated or chopped laser beam path. Sample gases to be analyzed are caused to flow through the sample cell 18 via inlet and outlet passageways 19 and 21.

A microphone 22 is coupled in acoustice wave energy exchanging relation with the gas within the sample cell 18. A beam power detector 23 is disposed at the terminal end of the laser beam path for monitoring the beam power incident thereon.

In operation, each pulse of the chopped laser beam, which is incident on the sample gas at a wavelength corresponding to an absorption line of the sample material, produces absorption of power from the beam and consequent heating of the sample gas within the cell 18. Heating of the gas produces expansion and therefore an acoustic wave at the chopper frequency within the sample cell. The acoustic waves are picked up by the microphone 22 and fed to one input of a lock-in amplifier 24 for amplification and synchronous detection against a sample of the chopper frequency, as of 20-400 Hz, derived from chopper 17. The amplified and detected output signal, which is a measure of the absorbance of the laser beam by the sample, is fed to one input of a divider 25 for division by a second signal derived from a second lock-in amplifier 26 which similarly lock-in amplifies and detects the beam power detected by a beam power detector 23. The lock-in amplifeir 26 receives a reference signal from the chopper 17. The output of the divider 25 corresponds to a sample absorption signal normalized to the beam power and this signal is recorded in a recorder 27 as a function of the wavelength of the tunable laser 28 as tuned by a tuner motor 29 which tunes the laser 28 by changing the angle θ of the diffraction grating 12. Thus, the recorder 27 records an absorption spectrum of the sample, such absorption spectrum being normalized to the beam power.

Referring now to FIG. 2 there is shown a laser spectrometer 31 incorporating features of the present invention. The spectrometer 31 is substantially identical to spectrometer 11 of FIG. 1 with the exception that the chopper 17 and optoacoustic sample cell 18 are located inside of the laser optical resonator, defined between the grating 12 and the output mirror 13. The advantage of locating the sample cell 18 inside of the laser optical resonator is a profound improvement in the performance of the spectrometer. More particularly, the laser beam power inside the laser optical resonator is within the range of 10-100 times greater than outside of the laser optical resonator. Thus, the available laser beam power for absorption by the sample constituents is increased by a factor of 10-100 thus improving the sensitivity by a factor of 10-100 for a given input power to the laser. This means that the input power to the laser can be reduced by a factor of 10-100 for a given sensitivity or that the sensitivity can be increased by a factor of 10-100 for a given laser.

Furthermore, the number of available laser lines can be substantially increased, as by a factor of 10, because the relatively low gain laser lines can be made to lase inside the optical resonator. Also such lines have more nearly equal power because they tend to saturate. Furthermore, the output mirror 13 can be substantially simplified because the output mirror does not have to be matched for each of the laser lines for maximum power output. Only a small fraction of the laser beam power need be extracted for the beam power measurement, such as 0.1% of the beam power inside the optical resonator. Actually, the output mirror 13 can be made totally reflective and the beam power measurement made inside the laser optical resonator in the manner as described below with regard to FIG. 3. In addition, the laser spectrometer 31 can be made substantially shorter than the system of FIG. 1 because the sample cell 18 and chopper 17 are located inside the optical resonator.

Referring now to FIG. 3 there is shown an alternative embodiment of the spectrometer of FIG. 2 wherein the beam power detector 23 detects approximately 1% of the laser beam power as reflected from the output Brewster angle window 35 of the sample cell 18. The window 35 is slightly skewed to produce the reflection of beam energy to the detector 23. In this embodiment, the output mirror 13 is made totally reflective and is preferably spherically curved with a radius of curvature of several times the length of the optical resonator. Such a resonator configuration encourages many of the higher order resonator modes to oscillate to maintain a homogeneous power distribution over the cross section of the laser beam. An advantage to the arrangement of FIG. 3 is that the overall length of the laser spectrometer is reduced even further since now the beam power detector 23 is located inside the laser optical resonator.

In addition, the enormous increase in laser power available to irradiate the LOS cell can be demonstrated by the properties of the well known helium neon laser. This laser has been commercially available with output powers in the milliwatt regime in the infrared spectrum at 3.39 microns. The optical cavity of this laser is nominally operated with an output coupler of a fraction of a per cent, so that the internal cavity power levels can approach the order of 1 watt. In this way, the LOS cell signal (providing the absorbing gas concentration is not sufficient to appreciably lower the optical cavity Q) will be orders of magnitude stronger over that which would be obtained by previous configurations where the LOS cell was outside of the laser cavity.

As used herein, "laser absorption spectrometer" is defined to mean a device wherein the absorption of laser beam energy by a sample under analysis is detected for a given wavelength of the beam energy.

Although, as thus far described, the sample absorption cell 18 has been disposed inside the optical resonator of the laser, the cell 18 in a less preferred embodiment could be placed inside an optical resonator excited by the output beam of the laser.

What is claimed is:

1. In a laser absorption spectrometer:
   means for defining an optical resonator;
   means for producing a laser beam of coherent radiation within said optical resonator;
   means for interposing a sample medium to be analyzed in said laser beam within said optical resonator for absorbing coherent radiation from said beam and for converting said absorbed coherent radiation of the beam into a second form of energy; and
   means coupled in energy exchanging relation with the sample medium for detecting said second form of energy resulting from absorption of energy, if any, by said sample medium from said laser beam.

2. The apparatus of claim 1 wherein said means for producing a laser beam within said optical resonator includes,
   means for disposing a gain medium within said optical resonator, said gain medium being capable of providing gain at resonant optical wavelengths of said optical resonator means, and means for exciting coherent stimulated emission of radiation from said gain medium at a resonant wavelength of said optical resonator.

3. The apparatus of claim 1 wherein the laser beam of coherent radiation is at an infrared wavelength and said optical resonator is resonant at said infrared wavelength.

4. The apparatus of claim 1 including, means for varying the wavelength of the coherent radiation of said laser beam.

5. The apparatus of claim 1 including, means for modulating the intensity of said laser beam.

6. The apparatus of claim 5 including, means for synchronously detecting the absorption of energy by the sample medium from said beam as a function of the modulation of the intensity of said laser beam.

7. The apparatus of claim 1 wherein the sample medium to be analyzed is a fluid and said detector means includes, acoustic detector means disposed in acoustic wave energy exchanging relation with the sample medium for detecting acoustic waves generated by the absorption of laser beam energy in the gaseous sample from the laser beam.

8. The apparatus of claim 1 including, means within said laser cavity for directing a portion of the laser beam energy into a detector to derive an output proportional to the energy of the laser beam.

9. The apparatus of claim 8 wherein said laser beam portion directing means comprises a skewed Brewster angle window.

10. In a method of laser absorption spectroscopy the steps of:
    exciting an optical resonator with a laser beam to produce a laser beam of coherent radiation within said optical resonator;
    interposing a sample medium to be analyzed in said laser beam within said optical resonator for absorbing coherent radiation from said beam and for converting said absorbed coherent radiation of the beam into a second form of energy; and
    coupling a detector in energy exchanging relation with the sample medium for detecting said second form of energy resulting from the absorption of energy, if any, by said sample medium from said laser beam.

11. The method of claim 10 including the step of exciting coherent stimulated emission of radiation from a laser gain medium within said optical resonator to provide the laser beam.

12. The method of claim 11 wherein the step of exciting coherent stimulated emission of radiation comprises the step of exciting coherent stimulated emission of radiation at an infrared wavelength.

13. The method of claim 12 including the step of varying the wavelength of the coherent radiation of said laser beam.

14. The method of claim 10 including the step of modulating the intensity of said laser beam.

15. The method of claim 14 including the step of detecting the absorption of energy from said laser beam by the sample medium as a function of the modulation of the intensity of said laser beam.

16. The method of claim 10 wherein the sample medium to be analyzed is a fluid and the step of detecting the absorption of energy includes, detecting the acoustic wave energy generated by the absorption of infrared energy in the gaseous sample from the laser beam.

17. The method of claim 10 including the step of diverting a portion of the laser beam energy from within the optical resonator and intermediate the length of the beam path to a detector to derive an output proportional to the laser beam power.

18. The method of claim 17 wherein the step of diverting a portion of the laser beam comprises, reflecting a portion of the laser beam off of a Brewster angle window inside said optical resonator.

* * * * *